United States Patent [19]
Conrad et al.

[11] 3,863,756
[45] Feb. 4, 1975

[54] RECIPROCATING CONVEYOR

[75] Inventors: Lucas J. Conrad, Winston-Salem;
Gerard E. Leonard, Kernersville;
Gary J. Simmons, Westfield, all of N.C.

[73] Assignee: R. J. Reynolds Company, Winston-Salem, N.C.

[22] Filed: Aug. 23, 1973

[21] Appl. No.: 390,969

[52] U.S. Cl.......................................... 198/220 CC
[51] Int. Cl............................................ B65g 27/00
[58] Field of Search.......... 198/220 CC, 220 DA, 198/220 DD, 220 BA, DIG. 3; 74/100, 87

[56] References Cited
UNITED STATES PATENTS

| | | | |
|---|---|---|---|
| 3,028,053 | 4/1962 | Brown et al. | 198/220 BA X |
| 3,216,557 | 11/1965 | Morris et al. | 198/220 CC |
| 3,238,798 | 3/1966 | Yeasting | 74/87 |
| 3,746,149 | 7/1973 | Schrader | 198/220 CC |

FOREIGN PATENTS OR APPLICATIONS

| | | | |
|---|---|---|---|
| 296,742 | 1/1928 | Great Britain | 198/220 DA |

*Primary Examiner*—Evon C. Blunk
*Assistant Examiner*—James M. Slattery
*Attorney, Agent, or Firm*—Grover M. Myers

[57] ABSTRACT

A reciprocating conveyor including a pan for carrying a live load and support from which will convey the pan. A drive and release mechanism associated with said pan imparts a first acceleration force to the pan in a first direction and terminates the first accelerating force from the pan at a predetermined location. Pressurized tubular pneumatic springs are associated with said pan and are compressed by said drive mechanism when it imparts the first acceleration force to the pan, thereby energy will be stored in the tubular pneumatic springs. The release mechanism causes the drive mechanism to disengage from the pan and the tubular pneumatic spring so that the energy stored in the tubular pneumatic spring will impart a second and greater acceleration force in a direction opposite the first direction.

13 Claims, 7 Drawing Figures

3,863,756

RECIPROCATING CONVEYOR

BACKGROUND OF THE INVENTION

This invention relates to a conveying apparatus and, more particularly, to the combination of a tubular pneumatic spring device with a conveyor pan to produce a reciprocating conveyor.

Presently, there are many types of reciprocating conveyors known and used to perform a variety of tasks in diverse industrial situations. All of the previously known reciprocating conveyors use the same principle to produce movement of the live load along the conveyor pan. Generally, there is an initial or conveying stroke which is characterized by a relatively slow acceleration of the conveying pan and live load in one horizontal direction followed by a second or working stroke which is characterized by a rapid acceleration of the pan in the opposite direction from the conveying stroke. In the conveying stroke, the pan with the live load carried thereon moved together in the first direction while in the working stroke, the inertial force imparted by the live load during the conveying stroke would be sufficient to overcome the friction force between the pan and the live load when the conveying pan is accelerated rapidly in an opposite direction, thereby causing the live load to slip along the surface of the pan.

Some of the previously known conveyors use steel coil springs to produce the accelerating forces during the work stroke while others use pneumatic springs. A steel coil spring normally has a low spring constant (pounds per inch deflection) which cannot be varied. In order to utilize a steel coil spring in a varying live load environment, the spring force must be large, variable and act through a short distance. This can be done by increasing the number of working springs and/or by increasing the initial spring compression as a function of live load. Mechanisms and their controls to deploy coil springs in this manner are expensive, hard to maintain and space consuming. Therefore, steel coil springs are not suited for use on reciprocating conveyors as the load may vary from almost zero to a very high maximum.

The pneumatic springs which are in use today will overcome some of the problems produced by using a steel coil spring. But, these previously known pneumatic springs produce other problems. Generally, there are two types of pneumatic springs used in reciprocating conveyors. The first type is a cylinder and piston in which air is passed to the cylinder and acts upon the piston which has a rod attached to the conveying pan. This type of pneumatic spring requires a very complex valving assembly to produce the accelerating forces required.

A second type of pneumatic spring is the annular-shaped air spring known as an "air stroke." This type of spring cannot be effectively used in reciprocating conveyors due to the distance to which the spring is required to operate for suitable conveying energy to be produced.

There are certain production situations in which the typical belt conveyor or the previously known reciprocating conveyor are not well suited. For example, on many occasions there is a vertical limitation placed on the conveyor by previously existing equipment or structure. In such a situation, a belt-conveyor cannot be easily used because of the height of the belt due to the belt return. Furthermore, the previously known reciprocating conveyors cannot be used because of their complex drive mechanism and valving system. Besides its vertical height limitations which prevents the use of some belt conveyors and reciprocating conveyors, the environment in which the conveyor is to be placed often dictates which type of conveyor can be used. For example, the belt conveyor cannot be used in a high temperature environment because of belt deterioration.

Another limitation placed on the conveyor is the volume requirement. Most of the previously known belt conveyors are adapted to move material from one place to another at relatively high speeds. There are many production situations, however, which require a large volume of material to be moved at a relatively low rate. These situations can be most aptly served by a reciprocating conveyor, but as mentioned above, most of the presently known reciprocating conveyors have problems also.

The development of the present reciprocating conveyor produces a conveyor which will overcome all of the problems discussed hereinabove. The combination of a tubular air spring generally of the type disclosed in U.S. Pat. No. 2,976,888 with the various types of mechanical drive systems produce the present unique reciprocating conveyor.

SUMMARY OF THE INVENTION

It is, therefore, an object of this invention to provide a simple drive and control mechanism for a reciprocating conveyor which is inexpensive and easy to maintain.

Another object of this invention is to provide a pneumatic spring in combination with a reciprocating conveyor wherein an extremely small amount of input energy will result in an extremely high force output over a short distance.

Another object of this invention is to provide a drive mechanism which can be utilized with a rigid pan as well as flexible pan reciprocating conveyors.

Another object of this invention is to provide a reciprocating conveyor which can be used to carry bulky and heavy loads for varying distances and predetermined rates.

Still another object of this invention is to provide a reciprocating conveyor which can be utilized to collect materials from processing equipment, transport the materials to a specific location for collection or further processing.

Still another object of this invention is to provide a conveyor system which can be utilized in a hostile environment and which can be adapted to small vertical space requirements.

Still another object of this invention is to rpovide an intra-machine conveyor which can be easily removed for "clean-up," etc.

These and other objects are accomplished by the present invention through the use of a conveying pan for carrying a live load of varying amounts. The conveying pan is supported for reciprocating on a suitable support structure. A pneumatic pressurized tubular spring assembly is attached to one end of the conveyor drive. The spring assembly provides one of the acceleration forces for the pan. A drive mechanism is provided to apply an initial force to the spring assembly so that potential energy is stored in the springs. The initial force applied to the spring assembly by the drive mechanism is transmitted to the conveying pan so that the pan will be accelerated in a first direction. A release mechanism will disengage the drive mechanism on the spring assembly and the pan is released from the action of the initial force. The potential energy stored in the spring assembly will be translated into a second accelerating force applied to the conveying pan in a second direction opposite the pan's first direction of movement. The second acceleration force will move the pan in the second direction at a relatively large acceleration.

The first acceleration force which is applied to the conveyor pan is transmitted through the pan to the live load carried thereon. The inertial force of the live load as it moves in the second direction is great enough to overcome the frictional force between the live load and the pan, thus, the live load will slide along the surface of the pan during the second acceleration of the pan.

BRIEF DESCRIPTION OF THE DRAWINGS

The foregoing and initial objects, features, and advantages of the invention will be apparent to those skilled in the art by the following detailed description of a preferred embodiment taken with the accompanying drawings, in which.

DESCRIPTION OF PREFERRED EMBODIMENTS

Figure 1:
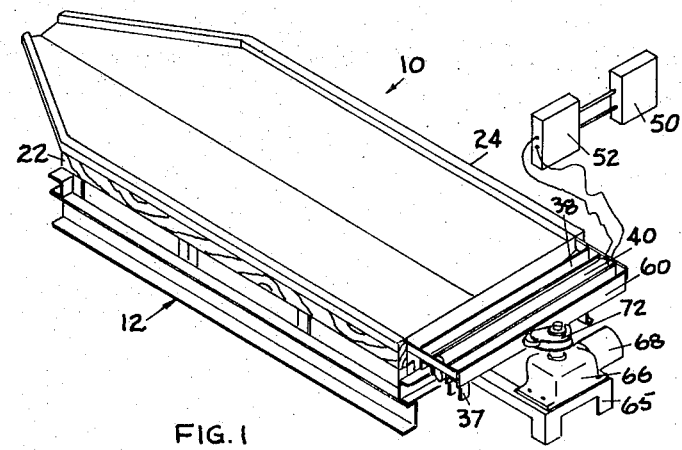
FIG. 1 is a perspective of one embodiment of a reciprocating conveyor according to the present invention.
Figure 2:
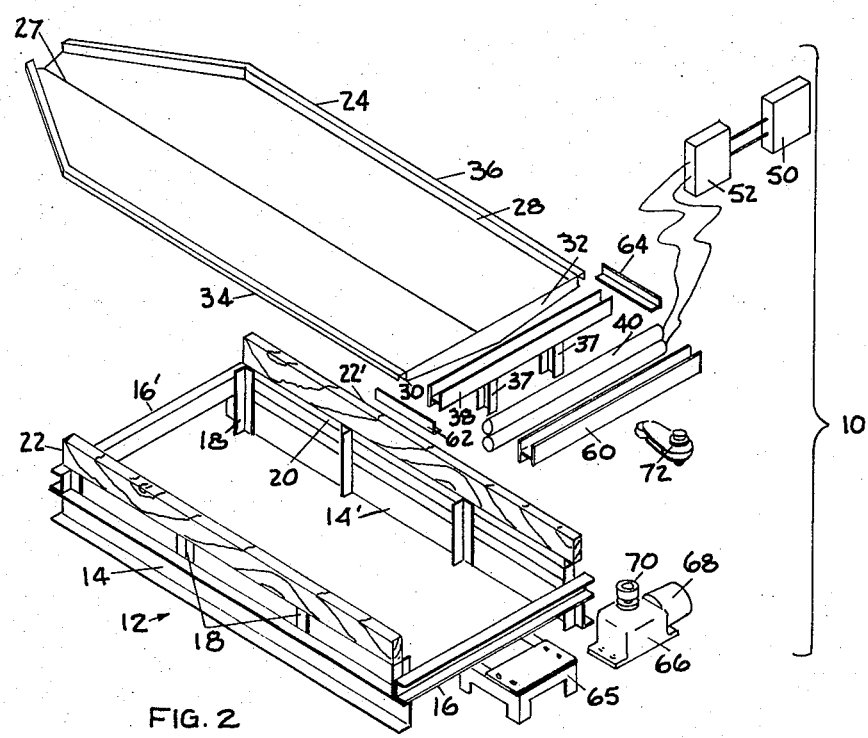
FIG. 2 is an exploded view of the perspective shown in FIG. 1.

Referring more particularly to the drawings, in FIGS. 1 and 2, the numeral 10 indicates a rigid pan reciprocating conveyor having a support frame 12. The support frame includes two longitudinal channels 16 and 16'. 14 and 14' spaced by two transverse end channels 16 and 16'. A plurality of vertical stud angles 18 are attached to the longitudinal channels 14 and support a longitudinal support angle 20 having one leg secured to the upper ends of the studs 18, while the other leg provides a flat surface upon which energy absorbing bearing members 22 and 22' are positioned. A rigid pan 24 made of a suitable sheet material such as steel has two bottom portions 25 and 26 which slope inwardly and terminate in a center groove 27. The pan has side walls 28 and 30 and an end wall 32 which closed one end of the pan. The other end of the pan is open to permit discharge of a material carried on the conveyor. Inverted side channels 34 and 36 are integrally formed with the pan and include the side walls 28 and 30. The inverted channels receive the upper portion of the bearing members 22 so that the pan is supported in the bearing members. Spring mount vertical studs 37 are secured to drive mount 65 and carry a spring mounting beam 38 attached to their upper ends. The spring mounting beam carries a plurality of pliable right-circular cylindrical tubular air springs 40 which are secured to the outer flange. The tubular springs are plugged at both ends, one end having an inlet through which a compressible fluid can be introduced into the springs from a pressure source 50. Between the pressure source and the tubular springs is a pressure regulating or control system 52 which is used to regulate the pressure inside the springs.

Located on the opposite side of the tubular air springs from the mount is compression anvil 60 which engages and compresses the tubular springs as will be explained hereinafter. At each end of the anvil are connector members 62 and 64 which connect the anvil 60 to pan 24. The connecting members 62 and 64 are angle members which extend into the inverted channels along the sides of pan 24.

Figure 3:
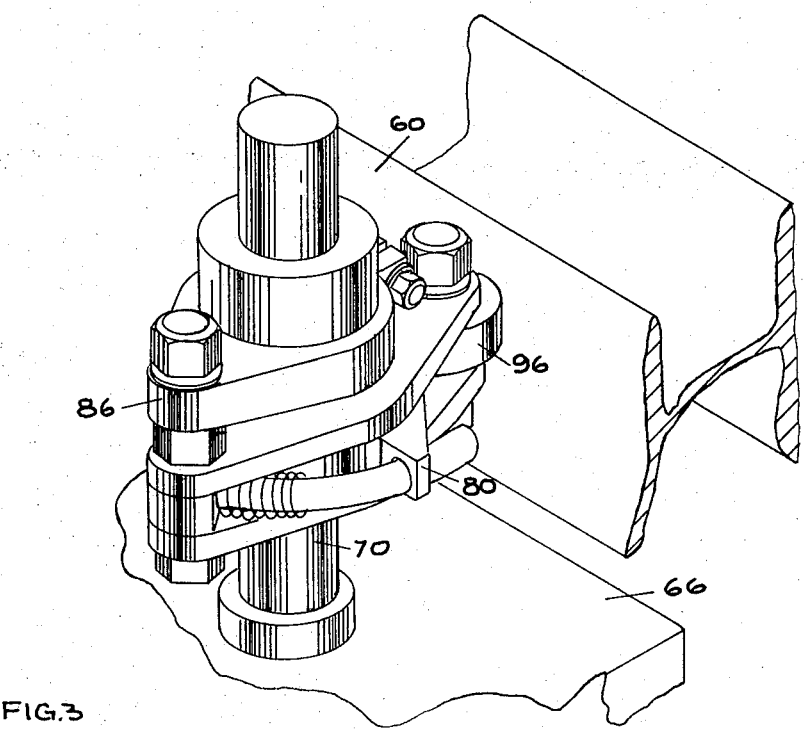
FIG. 3 is a detailed perspective of the drive mechanism used in the embodiment of the reciprocating conveyor illustrated in FIG. 1.
Figure 4:
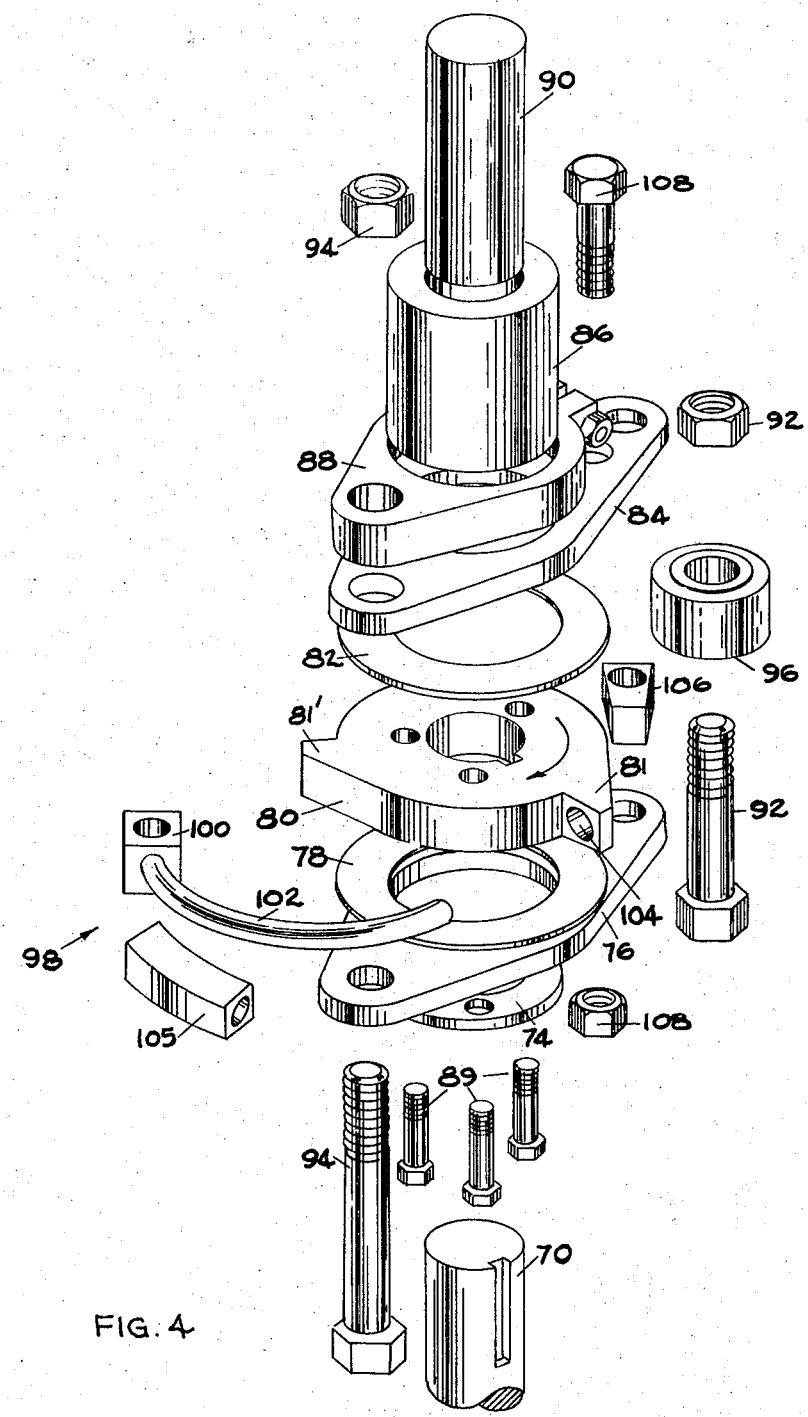
FIG. 4 is an exploded view of the detailed perspective shown in FIG. 3.

A drive mechanism is located in the center of the end of the conveyor adjacent anvil 60. A drive mount 65 supports a gear reducer assembly 66 which is driven by an electrical motor 68. A shaft 70 of the gear reducer extends upwardly from the box and carries a rotary drive head 72. (See FIGS. 3 and 4 for details).

The rotary drive head assembly includes a spacer bearing member 74 which is carried on shaft 70 and a lower winged plate 76 having a center aperture into which the spacer 74 is seated. A bearing washer 78 rests on the upper surfaces of the lower plate while a cam 80, having ears 81 and 81', is keyed to shaft 70. A second bearing washer 82 rests on the upper surface of cam 80 and separates the cam from an upper winged plate 84. A bearing and shaft connector 86 having a brake collector 88 secured thereto extends through the brake, the upper plate and the bearing washer 82 and rests on the upper surface of the cam 80. Three bolts 89 connect spacer bearing member 74 and cam 80 with shaft connector 86. A top shaft 90, extending through the bearing and shaft connector 86 is received in the center aperture of the cam.

The lower plate 76 and upper plate 84 are secured together by two fasteners 92 and 94. The plates have apertures through their wing portion through which the fasteners may pass. A roller 96 is held in place between the upper and lower plates by fastener 92. Fastener 94 secures a retaining spring assembly 98 between the upper and lower plates. The spring assembly 98 has a securing portion 100 and a curved guidearm 102 which is inserted into a bore 104 in the ear 81 on the cam 80. The fastener also secures the brake collar in position. A resilient element 105 such as a spring or tubular rubber member is carried on the guide arm 102 between the securing portion 100 and ear 81. Also secured between the upper and lower plates, adjacent the roller 96, is a stop element 106. The stop element is held in place by fastener 108.

The drive head operates as follows. When the motor 68 is operated, gear reducer shaft 70 is rotated in a clockwise direction and cam 80 will also be rotated clockwise. The bearing washers 78 and 82, as well as the bearing spacer 74 and the bearing shaft and connector 86, permit the plates to move freely with respect to the cam. As the cam 80 is rotated, ear 81 engages the spring 104 on guide arm 102, causing the plate assembly to begin moving with the cam. As the plates rotate with the cam, the roller 96 will engage the anvil 60 and the plates will begin to slip counter-clockwise due to the force applied by the anvil, thus, the spring 104 is compressed. Subsequently, ear 81' will engage stop 106 and continue to rotate the plate assembly clockwise. The roller 96 will force the anvil towards the tubular springs collapsing them to increase the pressure within the springs and applying increased forces to the anvil. When the head reaches and passes the center point of the engagement with the anvil, the force of the springs will push the plate rapidly away in a clockwise direction so that stop 106 is disengaged from ear 81'. This rapid movement of the plate is retarded by a brake 88, thus, preventing the roller from continuing to rotate rapidly and strike the anvil before ear 81 on the cam engages the spring 104 on the guide arm.

As mentioned above, anvil 60 compresses the stationary tubular springs 40 which are carried on stationary spring mount 38. The force on the anvil is also transmitted through the connector members 62 and 64 to pan 24, causing the pan to move to the left, as viewed in FIG. 1, at a relatively slow rate of acceleration. Any live load on the pan will move with the pan. The acceleration of the pan is relatively insignificant and, thus, will not cause the live load to slip on the pan due to the frictional force between the pan and the live load. When the drive head reaches midpoint and the tubular springs react on the anvil forcing it and the pan in an opposite direction, rapidly accelerating the pan, the frictional force between the pan and the live load is overcome by the live load inertial force and, thus, the load will slide on the pan.

The tubular air springs provide an effective means to control the force supplied to the pan. The pressure in the springs can be varied, thus, the spring constant can be varied. The spring is made of a very light material and the distance through which the spring is initially moved is small so that the energy required to retain the spring after it applies force to the anvil is small. Therefore, the energy from the spring can be used to accelerate the pan rather than retain the spring.

Figure 5:
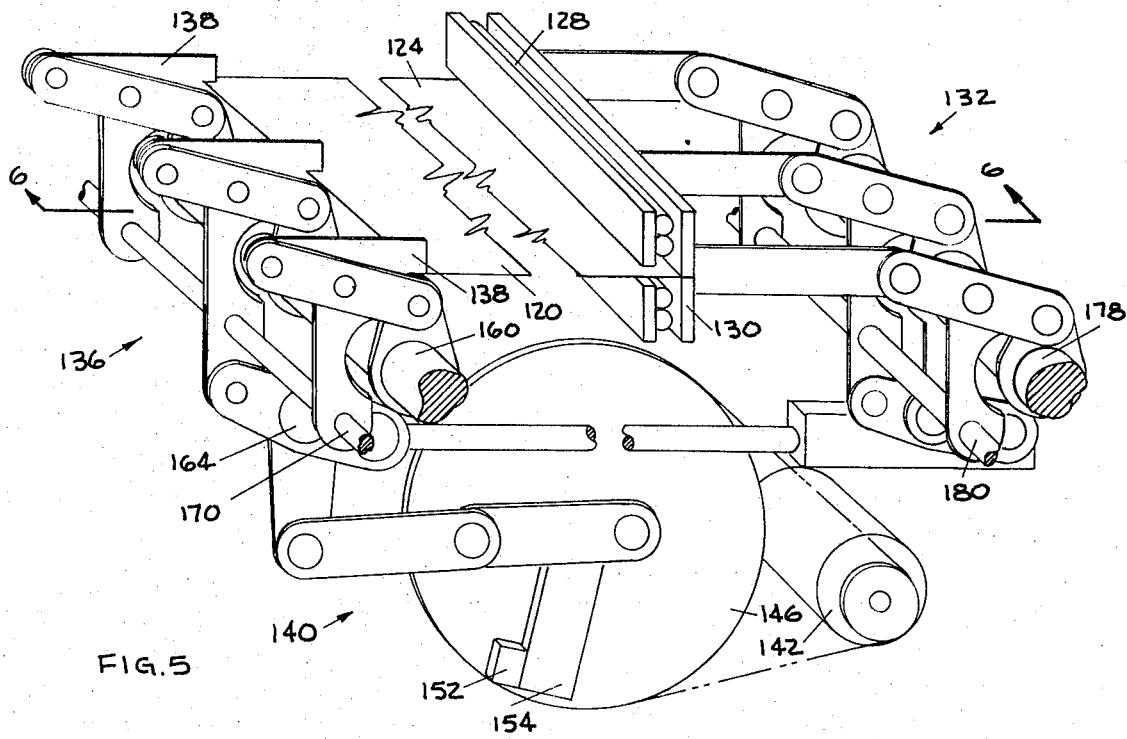
FIG. 5 is a perspective of another embodiment of the reciprocating conveyor utilizing a flexible pan in accordance with the present invention.
Figure 6:
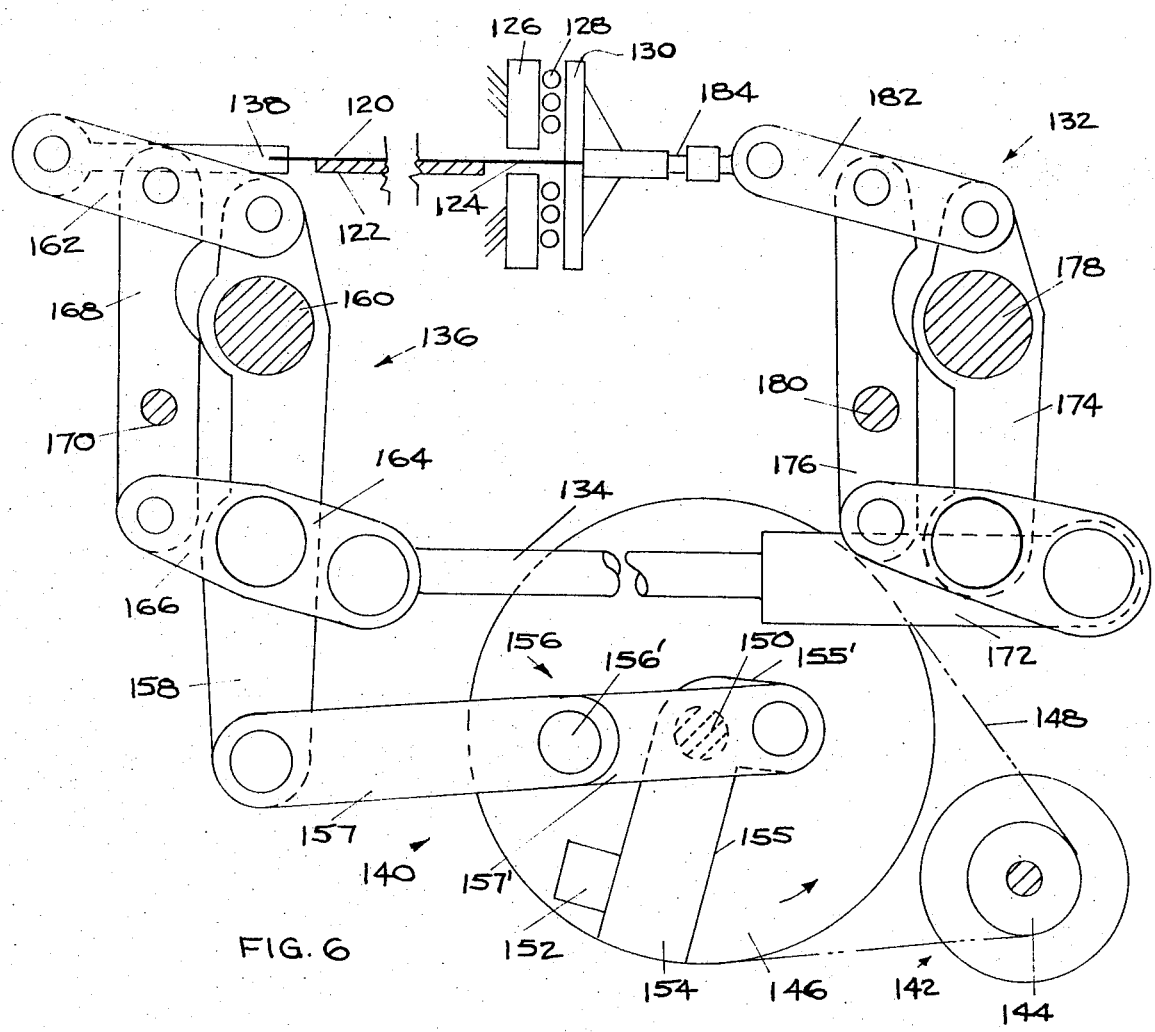
FIG. 6 is a sectional view of the reciprocating conveyor as taken on line 6—6 of FIG. 5.

A second embodiment of a reciprocating conveyor utilizing tubular air springs is illustrated in FIGS. 5 and 6. This embodiment uses a flexible pan resting on a support table. This embodiment is equipped with a drive mechanism which has a linkage assembly to transmit tension and compression in the systems through a bar rather than through the thin flexible pan. Also illustrated with this embodiment is a pressure control system shown in more detail in FIG. 7. The control system is used to reduce the pressure in the springs when the live load on the pan is decreased. This is necessary to prevent damage to the machine since the force required to accelerate the pan with a small load is not as great as the force required to accelerate the pan when a very heavy load is being conveyed.

The reciprocating conveyor (in FIGS. 5 and 6) includes a pan 120 which rests on a table or flat friction surface 122. The pan extends through a slot 124 in a stationary tubular spring mount or plate 126 which carries a plurality of air springs 128. The pan is connected to an anvil 130 which will also compress the tubular springs. The anvil 130 is connected to a rear mechanical linkage assembly 132 which is, in turn, connected through a tension rod 134 to a forward mechanical linkage assembly 136. The forward mechanical linkage assembly is secured to lugs 138 on the forward end of pan 120. The linkages are slaved together by the tension rods and both are manipulated by a crank linkage 140 which is driven by a drive motor 142. The drive motor 142 can be an electrical gear motor and carries a sprocket 144 on its shaft. The motor drives a crank sprocket 146 through a chain 148 which surrounds the motor sprocket and the crank sprocket. The crank sprocket is carried on a stationary shaft 150.

As viewed in FIG. 6, the crank sprocket 146 rotates in a counter-clockwise direction. A rubber bumper 152 is carried on the crank sprocket and will engage a generally L-shaped crank arm 154 which is also mounted on shaft 150 adjacent to sprocket 146. A double linkage 156 having single links 157 and 157' connects crank arm 154 with the forward linkage assembly 136. This double link will translate the rotational force of the crank arm to a reciprocating motion which is transmitted to the forward linkage.

As the sprocket 146 rotates, the bumper 152 engages the crank arm rotating leg 155 counter-clockwise. The other leg 155' of the crank arm is rotated counter-clockwise, thus, forcing the connection point 156' of the double linkage 156 downwardly. The downward movement of point 156' causes the lower end of power link 158 of the center forward linkage to move to the right, as viewed in FIG. 6. Power link 158 is rotatably carried on a stationary shaft 160 and has a pan link 162 that extends to the left and is secured between its upper end and lug 138 on the pan 120. The movement of the lower end of the link 158 to the right moves linkage 162 and, thus, the pan 120 to the left. In order to transmit this movement to the remainder of the foreward linkage assembly, keyed shaft 160 extends between the power link 158 and similar linkages located on opposite sides of the center linkage. This movement is transmitted to the rear linkage assembly through a linkage 166 which is connected to the forward end of the tension rod 134 and is carried on a pin 164. In order to prevent any vertical variation in the linear motion of the conveyor, a hold down link 168 is secured to the mid-point of link 162 and is rotatably mounted on a stationary shaft 170. The lower end of the hold down link 168 is connected to the forward end of link 166, thereby synchronizing movements of tension rod 134 and pan 120.

The movement of the forward linkage is transmitted through rod 134 to the rear linkage assembly 132, causing the rear linkage to manipulate in a similar manner as the forward linkage. The rear end of the rod 134 is connected to link 172 which is, in turn, connected at its midpoint to the lower end of vertical link 174 and at its left to the lower end of hold down link 176 which are carried on stationary shafts 178 and 180, respectively. This movement of rod 134 to the right is transmitted through the movement of linkage 172 and the rotational movement of links 174 and 176 into a leftward movement of link 182 which is attached to the upper ends of linkages 174 and 176.

Link 182 transmits the leftward movement through a rod assembly 184 to anvil 130 which will compress the tubular pneumatic springs 128 as the pan is being pulled to the left.

As the crank arm 154 continues to rotate, the arm will eventually override the stopper, causing the force being applied to the springs by the mechanical drive to be quickly released. The energy being stored in the springs is thereby released and a greater force is applied to the anvil 130 in a direction opposite its initial movement, causing the anvil to quickly accelerate to the right. The rapid acceleration of the anvil to the right will also cause pan 120 to move to the right since the pan is attached to the anvil. The live load carried on the pan will slip since the inertial force of the live load carried on the pan will overcome the frictional force between the pan and the load.

As mentioned above, pan 120 is made as a thin, flexible sheet material and, therefore, it cannot withstand compression stresses. The tension rod 134 transmits the inertial forces which will buckle the pan to the linkages at the opposite end of the conveyor, thus, pan 120 remains under tension at all times.

It has also been found that rigid and flexible pan conveyors will become damaged if there is a great variation in the weight of the live load carried on the pan unless the mass of the pan exceeds the mass of the maximum live load by more than 100 percent. Therefore, a pressure control system is utilized to reduce the pressure in the tubular air springs as the live load on the pan is decreased.

Figure 7:
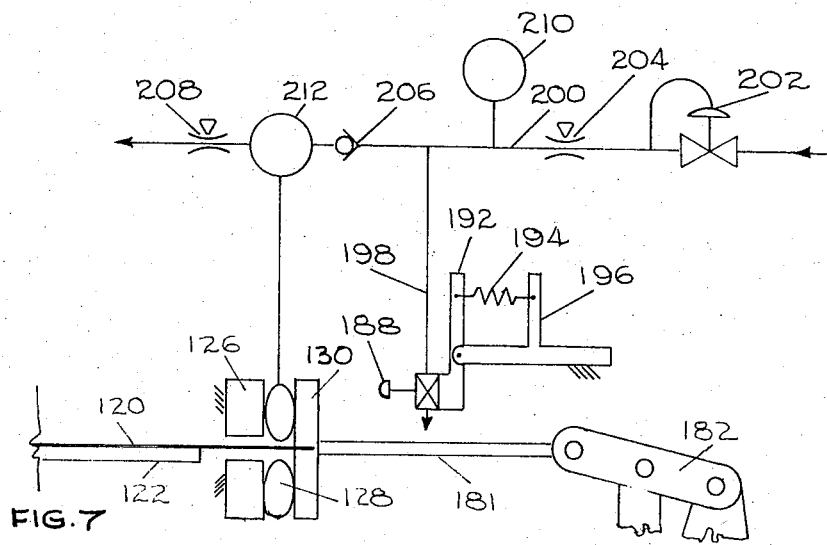
FIG. 7 is a schematic of the pressure control system for use on the reciprocating conveyor according to the present invention.

In FIG. 7, a button-bleed valve 188 is positioned adjacent the anvil 130 so that it will be engaged when the anvil is moved a predetermined distance. The bleed valve is mounted on a pivotal lever arm 192 which is biased in a vertical position. Spring 194 is attached to the top of an L-shaped lever support 196. It can be seen that, upon excessive movement of the anvil, the bleed valve will pivot to prevent the valve from being broken off by the anvil.

The bleed valve 188 is connected by a flexible line 198 to the main pressure line 200 which supplies air to the tubular air springs. A pressure regulator valve 202 in the pressure lines 200 is set to control the maximum pressure in the air springs. The pressure setting will depend on the feed rate for the conveyor for a given number of strokes per minute which is regulated by the drive motor. Between the pressure regulator 202 and the air springs is a first restrictor valve 204, a check valve 206 and a second restrictor valve 208. Surge tanks 210 and 212 are interposed in the line between valves 204 and 206 and 206 and 208, respectively. The surge tanks are used to smooth out pulsation introduced by bleed valve 188.

Restrictor valve 208 provides a control leak of the air from the air spring. If a live load on the pan is decreased to a point where the bleed valve will be operated, the leak will permit the pressure in the tubular springs to be reduced, thus, preventing damage to the conveyor by limiting pan travel. The restrictor valve 204 is set to permit slightly more volume of air to pass through than is allowed to pass by the restrictor valve 208. This will assure that the pressure in the tubular air springs will remain at the pressure regulator setting as long as the bleed valve is not being operated.

It can be seen from the above description and drawings that this improved reciprocating conveyor will provide a simple drive and control mechanism which is inexpensive and easy to maintain. The tubular air springs permit a small amount of input energy to be translated into a high output force so that heavy loads can be conveyed for varying distances at predetermined rates. The present conveyor also provides a system which can be used in a hostile environment that would be detrimental to other types of systems.

This preferred embodiment can be modified in various ways, such as changing the drive mechanisms, or the support of the pans or the pressure control circuit; moreover, these types of variations can be made to the subject invention without departing from the true spirit of the invention as defined in the following claims.

We claim:

1. A reciprocating conveyor comprising:
   a. pan means for carrying a live load to be transported by said conveyor;
   b. means for supporting said pan means;
   c. drive and release means attached to an acting on said pan means for imparting a first acceleration force to said pan means in a first direction and terminating said first acceleration force imparted to said pan means at a predetermined location; and
   d. pressurized pliable, right circular cylindrical, tubular, pneumatic spring means being contacted by said drive and release means and compressed as said drive and release means imparts said first acceleration force to said pan means in said first direction, whereby energy will be stored in said tubular pneumatic spring means, said tubular pneumatic spring means imparting a second and greater accelerator force to said pan means in a second direction opposite said first direction through said drive and release means as it disengages from said tubular pneumatic spring means, whereby the inertial force of the live load will overcome the frictional force between the pan means and the live load allowing the live load to slide in said first direction along the pan means.

2. The conveyor of claim 1, further including a pressure controlled system for regulating the pneumatic pressure in the pressurized tubular pneumatic spring means.

3. The conveyor of claim 1, wherein said pan means is constructed of a rigid material capable of transmitting compression and tension forces.

4. The conveyor of claim 3, wherein said rigid pan means has an inverted channel secured to each side and wherein said support means includes a frame having a pair of bearing members which are inserted in the inverted channels along the side of said rigid pan to support said pan along its edges which are parallel to the direction of movement of said pan means.

5. The conveyor of claim 3, wherein said drive and release means includes:
   a. an anvil located contiguous to the rigid pan said anvil being moveable in the direction of movement of said conveyor means;
   b. a connector member secured to said anvil and connecting it to said rigid pan;
   c. a rotatable drive head located adjacent to said anvil, said drive head engaging said anvil to impart said first acceleration force to said rigid pan through said anvil and connector member and compressing said tubular pneumatic spring means to produce the energy required to impart said second acceleration force to said rigid pan as said rotatable drive head is disengaged from said anvil; and
   d. means for rotating said drive head at a predetermined rate.

6. The conveyor of claim 3, further including a pressure control system for regulating the pneumatic pressure in the tubular pneumatic spring.

7. The conveyor of claim 5, wherein said pressurized tubular pneumatic spring means includes:
   a. a spring mount located between said anvil and said rigid pan; and b. at least one pliable, right-circular cylindrical tubular pneumatic spring carried on said spring mount.

8. The conveyor of claim 1, wherein said pan means is constructed of a flexible sheet material incapable of transmitting compression forces.

9. The conveyor of claim 8, wherein said support means includes a friction table upon which said flexible pan is carried.

10. The conveyor of claim 9, wherein said drive and release means includes:
   a. forward and rear linkage assemblies connected to said flexible pan;
   b. a tension rod connected between said forward and rear linkage assembly to transmit motion between the two assemblies; and
   c. means for manipulating said forward and rear linkage assemblies, said forward linkage assembly imparting a first horizontal accelerating force to said pan and said rear linkage assembly compressing said pneumatic tubular spring means.

11. The conveyor of claim 10, wherein said rear linkage assembly further includes an anvil member secured to said flexible pan and engaging and compressing said pressurized tubular pneumatic spring means.

12. The conveyor of claim 11, wherein said pressurized tubular air spring means includes:
   a. a spring mount located contiguous to said anvil, said spring mount having an opening through which said flexible pan can be inserted and secured to said anvil; and
   b. at least one elongated pressurized tubular pneumatic air spring carried on said spring mount.

13. The conveyor of claim 12, further including a pressure control system for regulating the pneumatic pressure in the tubular pneumatic spring.

* * * * *